United States Patent Office 3,153,079
Patented Oct. 13, 1964

3,153,079
PRODUCTION OF AMINO LOWER ALKYL
HYDROGEN SULFATES
Edward R. A. Forshaw, Sale Moor, England, assignor to
Shell Oil Company, New York, N.Y., a corporation of
Delaware
No Drawing. Filed May 9, 1961, Ser. No. 108,712
Claims priority, application Great Britain, May 17, 1960,
17,387/60
8 Claims. (Cl. 260—458)

This invention relates to the production of imines and relates more particularly to improvements in the production of monoalkylene imines from monoalkanol amines.

Alkylene imines, such as, for example, ethylene imine, are prepared by dehydration of corresponding alkanolamines in the form of their sulfates. It has been found advantageous to effect the preparation of the intermediate alkanolamine sulfates in a two-stage operation. In the first stage alkanolamine is reacted with sulfuric acid under controlled conditions of temperature to result in the formation of a reaction mixture comprising the sulfuric acid salt of the alkanolamine (N-sulfate). In the second stage the resulting reaction mixture, comprising the alkanolamine sulfuric acid salt, is heated to result in the formation of the corresponding ester, e.g., alkanolamine sulfate (O-sulfate). The latter reaction product is thereupon converted to the alkylene imine with the aid of a suitable alkaline material, such as, for example, aqueous sodium hydroxide. Utilization of this procedure in large scale operation heretofore generally has been considered to be impractical because of low yields and operational difficulties encountered in carrying out the second stage of the alkanolamine sulfate preparation. When carrying out the heating of the salt of the alkanolamine in bulk, there is obtained a solid crystalline, intractable mass. This step was, therefore, extremely difficult, if not impossible, to carry out without considerable loss of valuable material and without recourse to relatively costly operative procedures. Such operational procedures not only included those essential to bringing the reaction to conclusion but also those directed to the recovery of the resulting mass in a physical form suitable for utilization as charge to the imine-forming stage of the process. Such additional operations, comprising such as, for example, chipping, grinding, etc. contributed to no small degree to the overall cost of the process. As a result of this it was also difficult to carry out the above process in a continuous manner.

It is, therefore, an object of the present invention to provide an improved process for the production of imines from the alkanolamines wherein the above difficulties are obviated to at least a substantial degree.

In accordance with the present invention conversion of the alkanolamine charge to corresponding alkanolamine sulfate (the O-sulfate) suitable for utilization as charge to the imine formation, is carried out with substantially improved efficiency by combining the alkanolamine with concentrated sulfuric acid in a first reaction zone at a temperature below about 150° C. thereby forming a reaction mixture comprising the sulfuric acid salt of said alkanolamine (N-sulfate), and rapidly heating said reaction mixture comprising said alkanolamine sulfuric acid salt to a temperature above about 150° C. in a heating zone providing a high ratio of heating surface area to volume of reaction mixture, thereby converting said sulfuric acid salt of said alkanolamine to the alkanolamine sulfate. In a preferred embodiment of the invention said conversion of said alkanolamine sulfuric acid salt to said alkanolamine sulfate is carried out upon the surface of a heated rotating drum.

The invention is applied broadly to the production of imines from any substituted or unsubstituted alkanol amines via dehydration of their sulfates. Suitable alkanol amines comprise the aliphatic alkanolamines having up to about 20 carbon atoms, and preferably up to about 12 carbon atoms, for example, ethanolamine, propanolamine, their homologues, etc. Although applied broadly in the production of imines from any substituted or unsubstituted alkanolamine, it is applied with advantage when using alkanolamines in which the amino and hydroxyl groups are each attached to separate but adjacent carbon atoms, that is, the class of alkanolamines represented by ethanolamine and the alkyl substituted ethanol amines represented by the formula

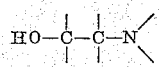

wherein the unsatisfied valencies are each attached to a member of the group consisting of hydrogen and hydrocarbyl radicals. The suitable hydrocarbyl radical may be methyl, ethyl, propyl, butyl, or higher alkyl groups. The invention is applied with particular advantage to the monoalkanolamines comprised within the above defined class. Specific examples of alkanolamines used as charge in the production of imines by dehydration of their sulfates, and to which the process is applied with particular advantage, comprise, for example, ethanolamine, the mono-N-substituted alkanolamines represented by N-methyl ethanolamine, N-ethyl ethanolamine, etc.

In order to set forth more clearly the nature of the invention it will be described hereinafter in its application to the production of ethylene imine by the dehydration of the sulfate form of ethanolamine. It is to be understood, however, that the invention is not limited in its application to the production of only this specific imine, but may be applied broadly to the production of any of the imines from the broad class of alkanolamines defined hereinabove.

In the first step in the preparation of ethylene imine, sulfuric acid is mixed and reacted with ethanolamine. On mixing the above two components, the liquid N-sulfate, that is to say the sulfuric acid salt

is formed initially. This reaction is exothermic and the temperature is held below about 150° C., and preferably below about 110° C. Generally, temperatures lower than about 50° C. are not employed. The suitable temperature is maintained by cooling the reaction by conventional means, for example, by indirect heat exchange with suitable cooling fluids.

The sulfuric acid used in the reaction preferably has a concentration above about 80%, for example, from about 96% to about 98% by weight. It is preferable to use the reactants in equimolar proportions so that the occurrence of undesirable side reaction is avoided as much as possible.

The resulting reaction mixture consisting essentially of the sulfuric acid salt of the ethanolamine, referred to herein as the N-sulfate, is converted to solid aminoethyl hydrogen sulfate, referred to herein as the O-sulfate ($H_2N—CH_2—CH_2—O—SO_3H$), by heating it rapidly to a temperature above about 150° C., preferably in the range of from about 170 to about 180° C.

Essential to the attainment of the objects of the invention is the rapid heating of the N-sulfate in the heating zone. The heating is preferably controlled to complete the desired conversion of the N-sulfate to the O-sulfate in the time of from about 0.25 to about 5 minutes, and preferably within the space of from about 0.5 to about 2 minutes.

The suitable heating of the N-sulfate to effect its conversion to the O-sulfate is obtained with the aid of a heating means providing a relatively high ratio of heating surface area to volume of reaction mixture. Suitable heating means comprise the conventional film driers.

The film drier used in the execution of the N-sulfate conversion reaction can be of any suitable design and construction. Preferably a drum film drier is used, which apparatus may comprise one or two drums. Suitable film driers of this type have been described, for example, on pages 863–864 of Perry's "Chemical Engineers' Handbook" (McGraw-Hill), 3rd edition, 1950. Another suitable type of film drier is a plate film drier. In this case liquid is fed to a horizontal heated revolving plate. The liquid spreads across the surface and solid is removed by a scraper at the periphery of the plate.

Under these conditions the N-sulfate is converted to the O-sulfate efficiently with a minimum of undesirable by-product formation. The O-sulfate is obtained in the form of small particle, or flake, form ideally suited for use as charge to the subsequent stage of the operation wherein it is converted to the corresponding imine.

During the formation of the N-sulfate, it is possible that some crystalline O-sulfate will be formed which may separate on standing from the liquid-n-sulfate. For this reason the conversion of N-sulfate to O-sulfate is carried out preferably as soon as the N-sulfate is formed. According to a preferred embodiment the process of the invention is carried out in continuous operation. The ethanolamine is mixed with the sulfuric acid, the resulting mixture being held at a temperature below 150° C., and the resulting mass is fed continuously to the film drier on which the conversion to the O-sulfate is carried out in a continuous operation.

Normally liquid carrying media for the alkanolamine salt and/or sulfate, which do not undergo any substantial conversion and which do not adversely affect the O-sulfate-forming reactions may be used within the scope of the invention.

In the last step of the process the aminoethyl hydrogen sulfate (O-sulfate) is converted into ethylene imine. This may be carried out, for example, by mixing the aminoethyl hydrogen sulfate with an alkaline substance, for example, a caustic alkali solution; it is preferably carried out in a continuous manner. This latter stage of the reaction can be carried out, for example, by dissolving the ethanolamine hydrogen sulfate in concentrated aqueous sodium hydroxide, heating the resulting solution, and distilling off ethylene imine. It is, however, preferred to add the aminoethyl hydrogen sulfate, preferably in admixture with aqueous sodium hydroxide, to a hot aqueous alkaline solution and distill off the resulting ethylene imine. Good yields of ethylene imine are obtained by adding the ethanolamine sulfate slowly and continuously to the aqueous caustic alkali solution. However, if the relevant sulfate is added in one portion to the caustic alkali solution, ethylene imine may be obtained together with some oily liquid consisting of polymerized ethylene imine.

The resulting alkylene imines are very useful in the production of chemical compounds such as dyestuffs and biocides. Furthermore, they can be polymerized with the aid of a catalyst, such as inorganic salts, for instance sodium bisulfate, organic or inorganic acids, silica gel, bleaching clay or active carbon.

The following examples are illustrative of the present invention.

In the following examples the relationship between parts by weight and parts by volume is the same as that which subsists between gram and cubic centimeter.

*Example I*

Equimolar quantities of monoethanolamine and 98% sulfuric acid were mixed at ambient temperature. The reaction mixture was cooled so that the temperature did not exceed 110° C. The resulting viscous syrup consisting essentially of the sulfuric acid salt of monoethanol amine was heated on a drum film drier maintained at 170° C. Drier consisted of two heated cylinders (8 inches diameter and 8 inches long) which were mounted side by side with their axes parallel. These cylinders revolved in opposite direction so that liquid which was poured into the "valley" between the cylinders ("nip roll feed") was carried first downwards and then to the outer side of the cylinders.

The cylinders were revolved at ½ r.p.m., and were heated internally by steam at a pressure of 80 lbs. per square inch. The syrup of sulfuric acid salt of monoethanolamine was poured into the "valley" between the cylinders. A solid reaction product formed, consisting essentially of aminoethyl hydrogen sulfate. This was removed as solid flakes, approximately half a revolution later, by means of a scraper. The residence time on the drier was thus 1 minute. The temperature of the cylinder was maintained at about 170° C.

The resulting aminoethyl hydrogen sulfate was added in small increments to an excess of caustic alkali. The ethylene imine formed was separated by distillation.

*Example II*

The process described in Example I was repeated using a different type of drum drier consisting of an 8 inch x 8 inch cylinder, maintained at a temperature of 170° C. The heating cylinder was fitted with two smaller cylinders mounted parallel to the first cylinder and above it. The liquid sulfuric acid salt of monoethanolamine was fed to the "valley" between these smaller rotating cylinders, and was thus smeared onto the surface of the larger heated cylinder. The resulting solid aminoethyl hydrogen sulfate was again removed by a scraper. The large drum revolved at ½ r.p.m. in this case also. Again the aminoethyl hydrogen sulfate was formed and obtained continuously as solid flaky material efficiently and without interruption.

The resulting aminoethyl hydrogen sulfate was added in small increments to an excess of caustic alkali. Ethylene imine formed and was recovered by distillation.

*Example III*

In this example two typical batches of amino ethyl hydrogen sulfate prepared as described in the foregoing example were reacted with caustic soda as follows:

A. 282 parts by weight of aminoethyl hydrogen sulfate was added to a 1000 parts by volume of caustic soda (240 g. NaOH/l.). The mixture was heated to boiling whereupon ethylene imine distilled off. The yield of ethylene imine was 55 parts by volume (50% of theoretical yield).

B. 210 parts by weight of aminoethyl hydrogen sulfate was added at ambient temperature to twice the molar quantity of an aqueous caustic soda solution. This mixture was then added slowly to a boiling aqueous caustic soda solution at such a speed that the ethylene imine formed was immediately distilled off. The yield of ethylene imine was 72 parts by volume (91% of theoretical yield).

I claim as my invention:

1. In a process for the production of an unsubstituted amino lower alkyl hydrogen sulfate wherein a lower unsubstituted alkanolamine is reacted with concentrated sulfuric acid at an elevated temperature, the improvement of heating said alkanolamine with said sulfuric acid in a first reaction zone maintained at a temperature of from about 50° to about 150° C., thereby forming a reaction mixture comprising the sulfuric acid salt of said alkanolamine in said first reaction zone, and rapidly heating said reaction mixture in a second reaction zone maintained at a temperature of from about 150° C. to about 180° C. and providing a high ratio of heating surface area to reaction mixture, thereby converting said sulfuric acid salt of said lower unsubstituted alkanolamine to the unsubstituted amino lower alkyl hydrogen sulfate corresponding to said sulfuric acid salt of said lower unsubstituted alkanolamine.

2. In a process for the production of an unsubstituted amino lower monoalkyl hydrogen sulfate wherein an unsubstituted lower monoalkanolamine is reacted with concentrated sulfuric acid at an elevated temperature, the improvement of heating said unsubstituted lower monoalkanolamine with said sulfuric acid in a first reaction zone maintained at a temperature of from about 50 to about 150° C., thereby forming a reaction mixture comprising the sulfuric acid salt of said unsubstituted lower monoalkanolamine in said first reaction zone, and rapidly heating said reaction mixture in a second reaction zone maintained at a temperature of from about 150° C. to about 180° C. and providing a high ratio of heating surface area to reaction mixture, thereby converting said sulfuric acid salt of said unsubstituted lower monoalkanolamine to the unsubstituted amino lower monoalkyl hydrogen sulfate corresponding to said sulfuric acid salt of said unsubstituted lower monoalkanolamine.

3. The process in accordance with claim 2 wherein said conversion of said unsubstituted lower monoalkanolamine to said unsubstituted amino lower monoalkyl hydrogen sulfate is effected upon the surface of a rotary film drier.

4. In a process for the production of an unsubstituted amino lower monoalkyl hydrogen sulfate wherein a monoalkanolamine containing an unsubstituted lower hydroxyl group and an amino group attached to adjacent carbon atoms is reacted with concentrated sulfuric acid at an elevated temperature, the improvement of heating said unsubstituted lower monoalkanolamine with sulfuric acid having a concentration of at least 80% in a first reaction zone maintained at a temperature of from about 50 to about 150° C., thereby forming a reaction mixture comprising the sulfuric acid salt of said unsubstituted lower monoalkanolamine in said first reaction zone, and rapidly heating said reaction mixture in a second reaction zone upon the surface of a film drier maintained at a temperature of from about 150 to about 180° C., thereby converting said sulfuric acid salt of said unsubstituted lower monoalkanolamine to the unsubstituted amino lower monoalkyl hydrogen sulfate corresponding to said sulfuric acid salt of said unsubstituted lower monoalkanolamine.

5. In a process for the production of amino monoethyl hydrogen sulfate wherein monoethanolamine is reacted with concentrated sulfuric acid at an elevated temperature, the improvement of heating said monoethanolamine with said sulfuric acid in a first reaction zone maintained at a temperature of from about 50° to about 150° C., thereby forming a reaction mixture comprising the sulfuric acid salt of said monoethanolamine in said first reaction zone, and rapidly heating said reaction mixture in a second reaction zone maintained at a temperature of from about 150° C. to about 180° C. and providing a high ratio of heating surface area to volume of reaction mixture, thereby converting said sulfuric acid salt of monoethanolamine to amino monoethyl hydrogen sulfate.

6. In a process for the production of amino monoethyl hydrogen sulfate wherein monoethanolamine is reacted with concentrated sulfuric acid at an elevated temperature, the improvement of heating said monoethanolamine with said sulfuric acid in a first reaction zone maintained at a temperature of from about 50 to about 150° C., thereby forming a reaction mixture comprising the sulfuric acid salt of said monoethanolamine in said first reaction zone, and heating said reaction mixture for a period of from about 0.25 to about 5 minutes in a second reaction zone maintained at a temperature of from about 150 to about 180° C. and providing a high ratio of heating surface area to volume of reaction mixture, thereby converting said sulfuric acid salt of said monoethanolamine to amino monoethyl hydrogen sulfate.

7. In a continuous process for the production of amino monoethyl hydrogen sulfate wherein monoethanolamine is reacted with sulfuric acid at an elevated temperature, the improvement of heating said monoethanolamine with concentrated sulfuric acid having a concentration about 80% by weight in a first reaction zone maintained at a temperature of from about 50 to about 150° C., thereby forming a reaction mixture comprising the sulfuric acid salt of said monoethanolamine in said first reaction zone, and heating said reaction mixture for a period of from about 0.25 to about 5 minutes upon the surface of a rotary film drier maintained at a temperature of from about 150 to about 180° C., thereby converting said sulfuric acid salt of said monoethanolamine to amino monoethyl hydrogen sulfate.

8. In a continuous process for the production of amino monoethyl hydrogen sulfate wherein monoethanolamine is reacted with sulfuric acid at an elevated temperature, the improvement of heating said monoethanolamine with an equimolar amount of sulfuric acid having a concentration of from about 96 to about 98% by weight in a first reaction zone maintained at a temperature of from about 50 to about 150° C., thereby forming a reaction mixture comprising the sulfuric acid salt of said monoethanolamine in said first reaction zone, and heating said reaction mixture for a period from about 0.5 to about 2 minutes upon the surface of a rotary film drier maintained at a temperature of from about 170 to about 180° C. thereby converting said sulfuric acid salt of said monoethanolamine to amino monoethyl hydrogen sulfate.

References Cited in the file of this patent
UNITED STATES PATENTS

| | | |
|---|---|---|
| 2,264,759 | Jones | Dec. 2, 1941 |
| 3,037,042 | Laemele | May 29, 1962 |